United States Patent [19]

Westerman et al.

[11] Patent Number: 4,693,807

[45] Date of Patent: Sep. 15, 1987

[54] APPARATUS AND PROCESS FOR THE CATALYTIC CONVERSION OF A LIQUID, AS OR LIQUID AND GAS

[75] Inventors: David W. B. Westerman; Andrew M. Scott, Amsterdam, both of Netherlands

[73] Assignee: Shell Oil Company, Houston, Tex.

[21] Appl. No.: 873,029

[22] Filed: Jun. 11, 1986

[30] Foreign Application Priority Data

Jun. 18, 1985 [GB] United Kingdom ............... 8515398

[51] Int. Cl.$^4$ .............................................. C10G 47/24
[52] U.S. Cl. .................................. 208/108; 422/198; 422/220; 423/659
[58] Field of Search ............... 422/176, 194, 195, 198, 422/208, 213, 220; 261/DIG. 54; 423/659; 208/53, 54, 127, 163, 164, 108

[56] References Cited

U.S. PATENT DOCUMENTS

| | | | |
|---|---|---|---|
| 2,416,491 | 2/1947 | Molique | 422/208 |
| 3,073,875 | 1/1963 | Braconier et al. | 422/198 |
| 3,702,237 | 11/1972 | Watkins | |
| 3,708,552 | 1/1973 | Kunii et al. | 260/683 R |
| 3,816,603 | 6/1974 | Welty | 422/198 |
| 3,913,242 | 10/1975 | Fackler et al. | 34/170 |
| 4,371,335 | 2/1983 | Jones | 422/194 |
| 4,446,112 | 5/1984 | Den Hartog | 422/195 |
| 4,568,523 | 2/1986 | Wijffels et al. | 422/195 |

FOREIGN PATENT DOCUMENTS 2840496 8/1979 Fed. Rep. of Germany.
1500213 2/1978 United Kingdom.

OTHER PUBLICATIONS

Patent No. 972.117, Application No. 20.648,12i,24, German, Abstract 63241B/35, DS 2840-496, German, Abstract, 5/26/1954.

Primary Examiner—David L. Lacey
Attorney, Agent, or Firm—Kimbley L. Muller

[57] ABSTRACT

The invention relates to catalytic conversion of fluid introduced into the upper end of a vessel (1), passed through a catalyst bed in the vessel (1), passed through passage (20) between guide elements (14) arranged in the vessel (1), and removed from the lower end of the vessel (1), wherein at or near narrow parts of the passages (20) cooling fluid is introduced into the passages (20) to control the temperature in the catalyst bed.

12 Claims, 4 Drawing Figures

APPARATUS AND PROCESS FOR THE CATALYTIC CONVERSION OF A LIQUID, AS OR LIQUID AND GAS

FIELD OF THE INVENTION

The invention relates to a process for the catalytic conversion of a liquid and/or a gas comprising the steps of introducing in the upper end of a vessel the liquid to be converted and a gas or the gas to be converted and a liquid, passing said liquid and gas through a bed of catalyst particles within the vessel, and removing the effluent obtained by the catalytic conversion from the lower end of the vessel.

Examples of such a process are hydroprocessing, hydrodesulphurization or hydrocracking. A further example is the catalytic conversion of synthesis gas, comprising hydrogen and carbon monoxide, into hydrocarbons in the boiling range of middle distillates.

These processes are exothermic. To control the temperatures in the catalyst bed it is known to allow the fluids participating in the conversion to flow out of the catalyst bed into a plurality of hollow bars with permeable walls, in which hollow bars the fluids are mixed with cooling fluid, and to allow the cooled fluids to enter the catalyst bed downstream of the hollow bars.

A disadvantage of the known process is that the permeable walls can easily be blocked by fragments of catalyst particles or by deposits of coke from the fluid, so that the fluids may have difficulties in reaching the mixing zone inside the hollow bars.

It is an object of the present invention to overcome the above disadvantage.

To this end the process for the catalytic conversion of a liquid and/or a gas according to the invention comprises the steps of introducing in the upper end of a vessel the liquid to be converted and a gas or the gas to be converted and a liquid, passing said liquid and gas through a bed of catalyst particles within the vessel, allowing the liquid and gas to pass through a plurality of passages defined between the outer surfaces of guide elements arranged in the bed of catalyst particles, the passages having in the direction of flow a narrowing part, a narrow part and a widening part, introducing an additional fluid into the passages at the narrowing part or at or near the narrow part of the passages, and removing the effluent obtained by the catalytic conversion from the lower end of the vessel.

The specification further relates to an apparatus for carrying out the process of catalytic conversion of a liquid or a gas comprising a vessel, inlet means for introducing into the vessel fluids and catalyst particles arranged at the upper end of the vessel, support means for supporting a bed of catalyst particles in the vessel, and discharge means for discharging from the vessel effluent and catalyst particles at the lower end of the vessel.

In the known apparatus, there is provided a grid of hollow bars having fluid permeable outer walls in which hollow bars there are arranged spray means for introducing, during normal operation, cooling fluid in the hollow bars, which cooling fluid will mix with the fluids that pass from this catalyst bed into the hollow bars.

It is an object of the invention to provide an improved apparatus.

To this end the apparatus for carrying out a process for the catalytic conversion of a liquid and/or a gas according to the invention comprises a vessel, inlet means for introducing into the vessel fluids and catalyst particles arranged at the upper end of the vessel, support means for supporting a bed of catalyst particles in the vessel, discharge means for discharging from the vessel effluent and catalyst particles arranged at the lower end of the vessel, and a grid of guide elements which is arranged in the vessel substantially perpendicular to the direction of fluid flow, wherein between the parts of the outer surfaces of adjacent guide elements facing each other a passage is defined having in the direction of fluid flow a narrowing part, a narrow part and a widening part, and wherein the guide elements are provided with means for introducing additional fluid into the passage, which means are arranged along the narrowing part or at or near the narrow part of the passage.

BACKGROUND OF THE INVENTION

Two prior catalytic converters are disclosed in G.B. No. 1,105,614 and G.B. No. 1,103,592 but are not disclosive of the instant apparatus and process. For example, G.B. No. 1,105,614 discloses a catalytic conversion apparatus having disposed therein a series of perforated hollow bars having a c-shaped sparger therein. There is no hint of a fluid distribution shape nor specific outlet openings for heat exchange fluid.

EMBODIMENTS OF THE INVENTION

One embodiment of this invention resides in an apparatus for the catalytic conversion of a reactant fluid which comprises an elongated vessel having interior and exterior side walls, said vessel having means for inlet of said reactant fluid and catalytic particles, a bed of catalytic particles supported on a support means and outlet means for removal from said vessel of catalytic particles and reacted fluid; at least one row of guide elements situated intermediate said means for inlet and said means for outlet and being supported on a support means communicating with said interior side walls of said vessel to form a restriction of flow of said fluid and catalytic particles through said vessel and defining, in direction of descending flow of said reactant fluid and said catalytic particles, a narrowing part, then a narrow part and then a widening part, said guide elements having a triangular fluid feed cap with two sloping side walls interconnecting a bottom member and having a cooling fluid conduit communicating within said triangular feed cap, wherein said bottom member of said feed cap is of sufficient length to extend beyond the terminal portion of said support means to define a multiple number of guide element cooling fluid outlet means to pass cooling fluid through said outlet means to enter said downflow of said reactant fluid and catalytic particles.

A second embodiment of this invention resides in an apparatus for the catalytic conversion of a reactant fluid in the presence of catalytic particles which comprises an elongated vessel having interior side walls and exterior side walls; inlet means for entry to said vessel of said reactant fluid and said catalytic particles; catalytic particles support means communicating with said interior side walls of said vessel to support said catalytic particles in said vessel; outlet means for removal of said reactant fluid after passage through said vessel; at least one row of flow guide elements situated relatively perendicular to the flow of fluid through said vessel, each such guide elements being supported by a support beam and comprising at least two sloping side members and a bottom member wherein said length of said bottom member is greater than the length of said support beam; a multiple number of heat exchange fluid outlets situated intermediate the terminal end of said support beam and the terminal end of said bottom member to permit entry of heat exchange fluid to said reactant fluid passing through said vessel.

DETAILED DESCRIPTION OF THE INVENTION

Figure 1:
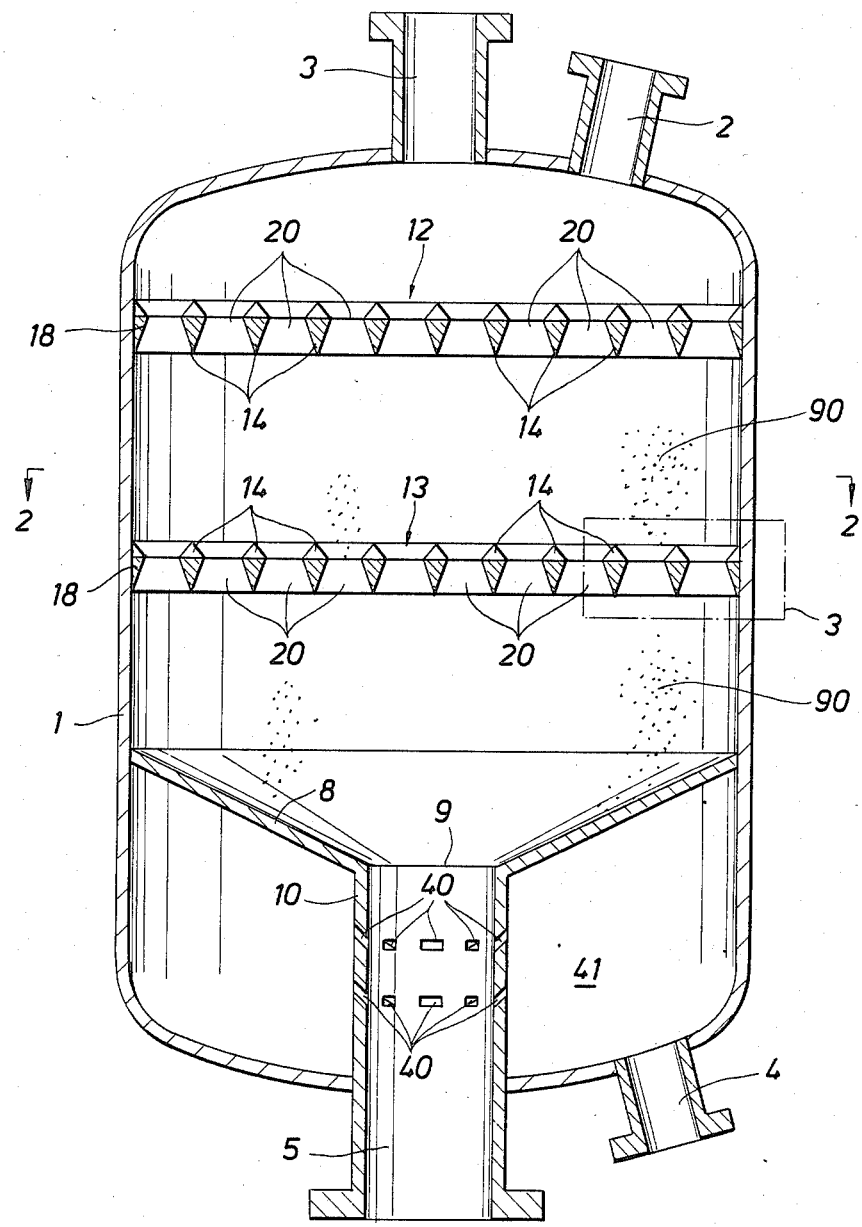
FIG. 1 shows a schematic longitudinal section of the apparatus of this invention.

This invention will be described by way of example with reference to the drawings of FIGS. 1–4 which are not to be construed as a limitation upon the apparatus elements and process steps of this invention. The apparatus according to the invention comprises a vessel 1, a fluid inlet 2 and a catalyst inlet 3 arranged at the upper end of the vessel 1, and a fluid outlet 4 and a catalyst outlet 5 arranged at the lower end of the vessel 1. Furthermore, vessel 1 comprises a support cone 8 for supporting a bed of catalyst particles 90 in the vessel 1, which support cone 8 has a central opening 9 which is connected by means of tube 10 to the catalyst outlet 5. Furthermore, the catalyst outlet 5 is provided with valve means (not shown) for allowing or stopping discharging of catalyst particles from the vessel 1.

In addition, vessel 1 is provided with a first grid 12 and a second grid 13, which grids are arranged at different levels in the vessel 1 substantially perpendicular to the direction of fluid flow through vessel 1. Each grid comprises guide elements 14, which are connected to a ring-shaped support member 18 joined to the inner surface of the side-wall of vessel 1. The guide elements pertaining to the first grid 12 are preferably staggered with respect to the guide elements pertaining to the second grid 13.

Between the facing parts of outer surfaces of adjacent guide elements 14, and between the facing parts of the outer surfaces of the ring-shaped support member 18 and the adjacent guide elements there are defined passages indicated with reference numeral 20. Each of the passages 20 comprises in the direction of fluid flow a narrowing part 21, a narrow part 22 and a widening part 23. For the sake of clarity, the reference numerals referring to the parts of the passages 20 have only been included in FIG. 3.

Each guide element 14 comprises a triangular fluid feed cap 25 (see FIG. 3) having side walls 26 and a bottom wall 28, in which fluid feed cap 25 a fluid conduit 29 is defined. Each ring-shaped support member 18 comprises a fluid feed cap 30 having side wall 26 and bottom wall 28, in which fluid feed cap 30 there is defined by a fluid supply conduit 31 which is in fluid communication with the fluid conduit 29 in the triangular fluid feed caps 25 and with an additional fluid inlet 32 (see FIG. 2).

Each of the fluid feed caps 25 and 30 is supported by a support beam 33. The fluid feed caps are so wide that the bottom wall 28 extends beyond the support beam 33, along the length of the support beam 33. In the part of the bottom wall 28 extending beyond the support beam 33 there are arranged means for introducing additional fluid into a passage in the form of a row of outlet openings 35 (see FIG. 3), which are in fluid communication with the fluid conduit 29, or, for the outlet openings 35 pertaining to the ring-shaped support member 18, with the fluid supply conduit 31.

It will be appreciated that the above described details of the guide elements and ring-shaped support member pertaining to the second grid 13 are included as well in the guide element and ring-shaped support member pertaining to the first grid 12.

The process of catalytic conversion of sulfur containing hydrocarbon oil into a substantially sulfur-free hydrocarbon oil with the use of hydrogen will now be described. Catalyst particles are supplied via the catalyst inlet 3 until the space above the support cone 8 and in the tube 10 is filled with a bed of catalyst particles 90. Subsequently a mixture of sulfur containing hydrocarbon oil and hydrogen, at a temperature in the range of from 300° C. to 500° C. and at a pressure in the range of from 3 MPa to 25 MPa, is introduced into the vessel 1 via the fluid inlet 2.

In the reactor an exothermic reaction will occur, wherein hydrogen and the sulfur in the sulfur containing hydrocarbon oil react to give hydrogen sulfide and a substantially desulfurized hydrocarbon oil. The mixture of hydrocarbon oil and hydrogen sulfide is allowed to flow in downward direction and to pass through upward tilting separator slits 40 arranged in the wall of the tube 10 into an effluent collecting space 41 below the support cone 8, from which the mixture is discharged via fluid outlet 4. Upon cooling, the formed hydrogen sulfide is subsequently separated from the desulfurized hydrocarbon oil in a suitable separator (not shown). When the catalyst is deactivated, for example after 6 to 12 months the process is interrupted, all catalyst particles are discharged from the vessel 1, and the vessel 1 is subsequently filled with fresh catalyst particles.

Figure 3:
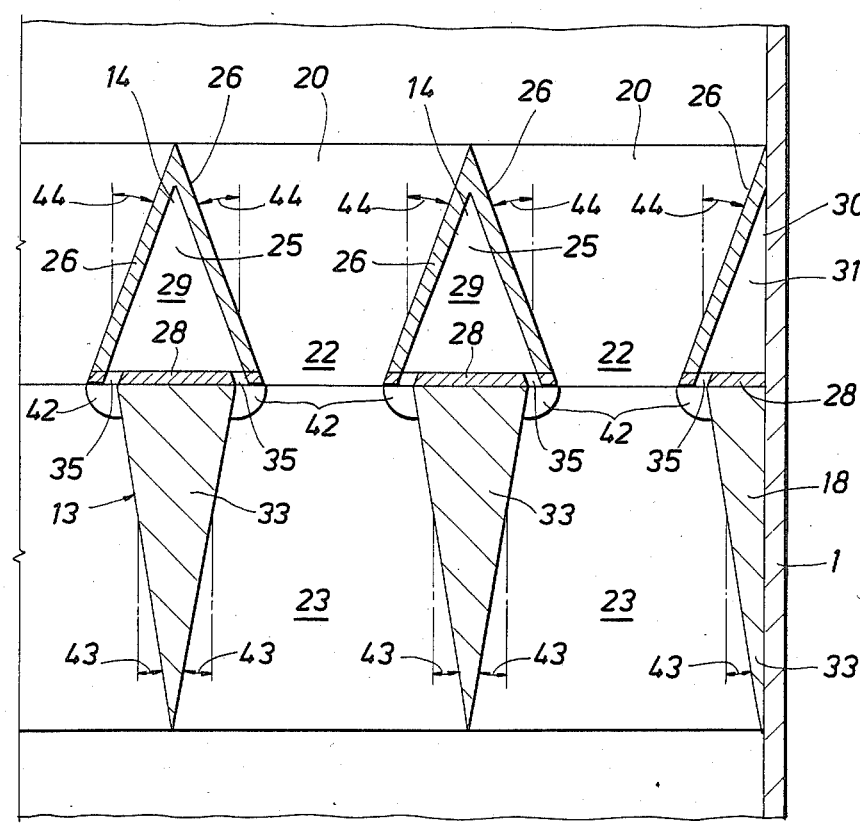
FIG. 3 shows an enlarged view of area III of FIG. 1.

In order to control the temperature in the vessel additional fluid in the form of cooling fluid, comprising, for example, cooled desulfurized hydrocarbon oil or quench gas, is supplied to the additional fluid inlet 32 pertaining to at least one of the grids 12 and 13, which cooling fluid will enter the passages 20 through the outlet openings 35 near the narrow parts 22 of the passages 20 (see FIG. 3).

In this manner the reaction products are cooled in the region where the passage is reduced, and consequently where the fluid velocity and turbulence are increased. Thus, an improved heat exchange between the hot reaction products and the additional fluid is obtained.

To obtain a sufficient heat exchange and a moderate pressure drop over a grid, the total cross-sectional area of the passage 20 should be in the range of from 30% to 60% of the cross-sectional area of the vessel 1, and preferably in the range of from 45% to 55%.

The bottom walls 28 of the fluid feed caps 25 and 30 extend beyond the support beams 33. When the vessel is filled with catalyst particles 90, these particles will be so distributed in the vessel 1 that under the sides of the bottom walls 28 extending beyond the support beams 33 there exist catalyst-free distribution spaces 42 (see FIG. 3) extending in longitudinal direction of the support beams 33. Since the fluid outlet openings 35 are arranged in the side of the bottom walls 28 extending beyond the support beam 33, cooling fluid is introduced in the distribution spaces 42 so that, before it enters the bed of catalyst particles 90, the cooling fluid is uniformly distributed in the distribution spaces 42. This reduces the chance of a non-uniform temperature distribution in the catalyst bed in the passages 20.

In order to obtain a uniform distribution of liquid flowing through the widening part 23 of each passage 20, the acute angle 43 between the vertical and the part of the outer surface of a guide element 14 or of the ring-shaped support member 18 defining the widening part 23 should be matched with the liquid spreading angle. For liquids flowing through a bed of conventional catalyst particles the acute angle 43 is in the range of from 3° to 10°.

The uniform distribution of liquid in the widening part 23 of each passage 20 has a beneficial effect on the efficiency of reaction because non-uniform contacting of the liquid with catalyst and consequently non-uniform temperature distribution in the catalyst bed and consequently non-uniform fouling of catalyst particles is avoided.

In the above described process, deactivated catalyst is refreshed only after substantially long periods. In an alternative embodiment of the invention, a volume of catalyst particles is discharged from the vessel and is replaced by a volume of fresh catalyst particles introduced into the vessel via the catalyst inlet 3. Moving the catalyst bed in bunker flow over a small distance so as to allow replacing a volume of deactivated catalyst particles by a volume of fresh catalyst particles may be carried out at short intervals, for example once a day.

To ensure that, when the catalyst particles in the narrowing part 21 of a passage 20 move downwardly in a uniform manner, so that the catalyst particles near the surfaces defining the narrowing part 21 will move at about the same velocity as the catalyst particles in the central part of the narrowing part 21, the acute angle 44 between the vertical and the part of the outer surface of a guide element 14 or of the ring-shaped support member 18 defining the narrowing part 21 should be so selected that mass flow will occur. For conventional catalyst particles the acute angle 44 is in the range of from 10° to 40°.

In an alternative process a gas is converted to a liquid, and, to this end a mixture of gas and liquid is introduced into the vessel through the fluid inlet 2.

An example of such a process is the conversion of synthesis gas, comprising hydrogen and carbon monoxide, into a liquid hydrocarbon in the boiling range of a middle distillate.

In this process a mixture of synthesis gas and recycled liquid hydrocarbon at a temperature in the range of from 200° C. to 250° C. and at a pressure in the range of from 2 MPa to 4 MPa is introduced into the catalyst bed in the reactor. In such a process the purpose of the liquid is to transfer heat to obtain uniform temperature distribution in the catalyst bed in the vessel. During normal operation cooled recycled liquid hydrocarbon product is supplied to the additional fluid inlet 32 and enters the vessel 1 through multiple outlet openings 35 in order to cool the products.

The apparatus described with reference to FIG. 1 is provided with two grids of guide elements; a very small apparatus can be provided with only one grid of guide elements, and, on the other hand, a larger apparatus can be provided with more than one grid, for example 3 to 10 arranged at different levels in the vessel.

In the guide elements described with reference to FIG. 3, the means for introducing additional fluid into a passage are arranged in the sides of the bottom wall extending beyond the support beam, so that during normal operation additional fluid is introduced near the narrow part of the passage.

Figure 2:
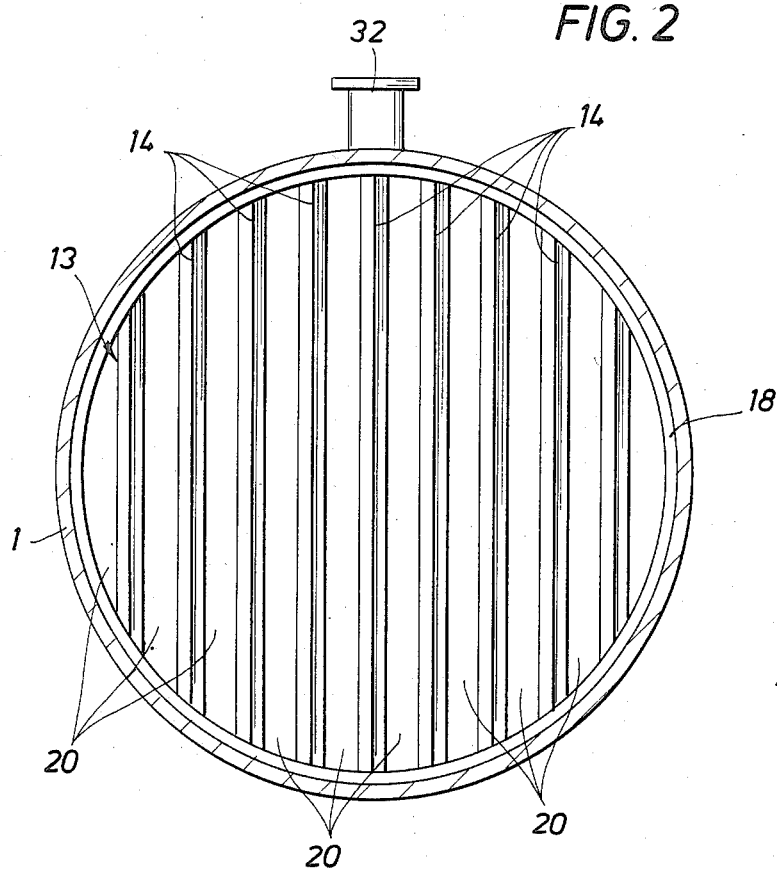
FIG. 2 shows a cross-section of the apparatus of FIG. 1 along line II—II.
Figure 4:
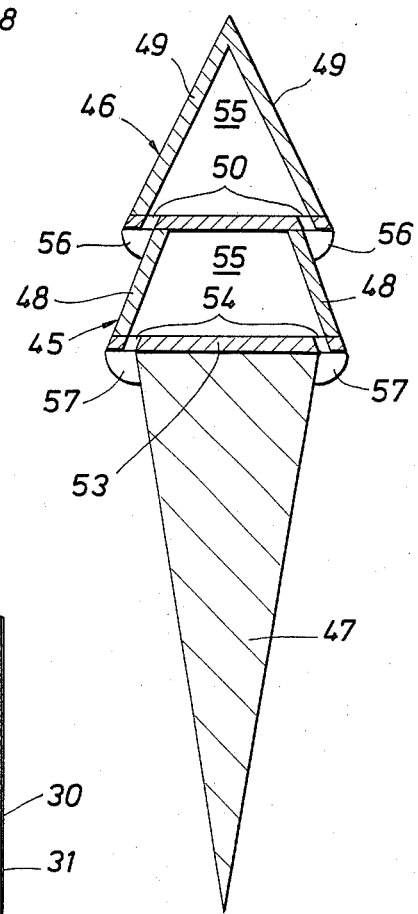
FIG. 4 shows a cross-section and alternative design embodiment of the guide element of FIG. 3.

Reference is now made to FIG. 4 showing a guide element 45 that can replace part of, or all guide elements 14 in the grids 12 and 13 as described with reference to FIGS. 1, 2 and 3. The guide element 45 comprises a triangular fluid feed cap 46 supported by a support beam 47. Each side wall of the triangular fluid feed cap 46 comprises a lower strip 48 and an upper strip 49 extending along the length of the guide element 45, and so arranged one above the other that the lower part of the upper strip 49 overlaps the upper part of the lower strip 48. Means for introducing additional fluid into a passage in the form of a row of outlet openings 50 are arranged along the narrowing part of a passage in the area where the upper strip 49 overlaps the lower strip 48, which area extends along the guide element 45.

In addition, bottom wall 53 of the fluid feed cap 46 is so wide that it extends beyond the support beam 47, and means for introducing additional fluid in the form of a row of outlet openings 54 are arranged in the part of the bottom wall 53 extending beyond the support beam 47.

The outlet openings 50 and 54 are in fluid communication with a fluid conduit 55 arranged within the triangular fluid feed cap 46, which fluid conduit 55 is in fluid communication with the fluid supply conduit 31 pertaining to the ring-shaped support member 18 (see FIG. 3).

During normal operation, the vessel is filled with a bed of catalyst particles 90 so distributed in the vessel that there exist catalyst-free distributor spaces 56 and 57 below the area where the strips 49 overlap the strips 48 and below the sides of the bottom wall 53 extending beyond the support beam 47. Additional fluid, supplied to the fluid conduits 55 pertaining to the guide element 45 of each grid, will be introduced via the openings 50 and 54 into the narrowing parts and near the narrow part of each passage.

The fluid feed cap pertaining to a ring-shaped support member is provided with a side wall comprising two strips extending along the support member and arranged so that the lower part of the upper strip overlaps the upper part of the lower strip, wherein means for introducing additional fluid into the passage are arranged in the area where the upper strip overlaps the lower strip.

The acute angle between the outer surfaces of the strips and the vertical should be in the range of from 10° to 40°.

The sides of the triangular fluid feed cap may comprise more than two strips, for example 3 to 5, extending along the guide element and so arranged one above the other that the lower part of the upper strip overlaps the upper part of the lower strip, wherein means for introducing additional fluid are arranged in the area where the upper strip overlaps the lower strip so as to allow introduction of additional fluid into the narrowing part or at the narrow part of a passage.

Each row of outlet openings 35 (see FIG. 3), 50 and 54 (see FIG. 4) extend along the corresponding guide elements, such a row of outlet openings can at least partly be replaced by a slit extending along at least part of the guide element.

During normal operation, additional fluid in the form of a fluid required for the catalytic conversion can be supplied. An example of such an additional fluid is hydrogen gas supplied to maintain a required ratio between the volumes of sulphur containing hydrocarbon oil and hydrogen in the above described process of catalytic conversion of a sulphur containing hydrocarbon oil.

Where the process of catalytic conversion of a liquid and/or a gas is endothermic, the additional fluid comprises a heating fluid, for example steam, or heated fluid required for the catalytic conversion.

In the apparatus described with reference to FIG. 1 the support means for supporting a bed of catalyst particles 90 in the vessel 1 comprises a support cone 8. In an alternative embodiment of the invention the catalyst bed may be supported by a perforated plate or a wire mesh which have the additional advantage of enhancing the catalyst/fluid separation. The catalyst bed may also be supported by the bottom wall of the vessel 1. In addition, gas and liquid comprising the fluid can be supplied to the vessel via separate inlet means.

It will be appreciated that the apparatus may comprise more than one bed of catalyst particles arranged axially spaced apart in the vessel, wherein at least one of the beds is provided with the guide elements as described hereinabove.

What we claim as our invention:

1. An apparatus for the catalytic conversion of a reactant fluid which comprises:
   (a) an elongated vessel having a top, a bottom, and interior and exterior side walls, said vessel having means for inlet of the reactant fluid at the top of said vessel and catalytic particles at the top of said vessel, a bed of catalytic particles supported on a support means and outlet means at the bottom of said vessel for removal from said vessel of catalytic particles and reacted fluid where said reactant fluid and catalytic particles flow in a descending path through said elongated vessel;
   (b) at least one row of guide elements situated intermediate said means for inlet and said catalytic particles support means and being supported on a support means communicating with said interior side walls of said vessel to form a restriction of flow of said fluid and catalytic particles through said vessel and defining, in direction of descending flow of said reactant fluid and said catalytic particles, a narrowing part, then a narrow part and then a widening part, said guide elements having a triangular fluid feed cap with two sloping side walls interconnecting a bottom member and defining a cooling fluid conduit communicating within said triangular feed cap, wherein said bottom member of said feed cap is of sufficient length to extend beyond the terminal portion of said guide element support means and includes a multiple number of guide element cooling fluid outlet means to pass cooling fluid through said cooling fluid outlet means to enter said downflow of said reactant fluid and catalytic particles.

2. The apparatus of claim 1 wherein said support means communicating with said interior walls of said vessel and said fluid feed cap have a side member and bottom member which comprise a right triangle, wherein said bottom member of said triangle is longer than said side member of said triangle to form a fluid outlet means therebetween for passage of fluid in a downflow direction with respect to the flow of said reactant fluid and catalytic particles.

3. The apparatus of claim 1 wherein the cummulative passage area of said narrow part is equal to from 30 to 60 percent of the total cross sectional area of said vessel.

4. The apparatus of claim 1 wherein said bottom member of said feed cap extends beyond said guide element support means to form a catalyst-free cooling fluid distribution zone to provide that said cooling fluid enters said distribution space before admission to said flow of said catalytic particles and reactant fluid.

5. An apparatus for the catalytic conversion of a reactant fluid in the presence of catalytic particles which comprises:
   (a) an elongated vessel having a top, a bottom, interior side walls and exterior side walls;
   (b) inlet means in said top of said vessel for entry to said vessel of said reactant fluid and said catalytic particles;
   (c) catalytic particles support means communicating with said interior side walls of said vessel to support catalytic particles in said vessel;
   (d) outlet means in said bottom of said vessel for removal of said reactant fluid after passage through said vessel wherein said reactant fluid and catalytic particles flow in a descending path through said elongated vessel;
   (e) at least one row of flow guide elements situated relatively perpendicular to the flow of fluid through said vessel and positioned intermediate said inlet means and said catalyst particles support means, each of said guide elements being supported by a support beam and comprising at least two sloping side members and a bottom member wherein said length of said bottom member is greater than the length of said support beam;
   (f) a multiple number of heat exchange fluid outlets positioned in said guide elements and situated intermediate the terminal end of said support beam and the terminal end of said bottom member to permit entry of heat exchange fluid to the reactant fluid descending through said vessel.

6. The apparatus of claim 5 wherein said heat exchange fluid outlets communicate with a heat exchange fluid supply conduit defined by said sloping side members.

7. The apparatus of claim 5 wherein the two sloping side members provide a restriction in the flow of reactant fluid and comprises a narrowing part, a narrow part and a widening part wherein said narrow part defines the area of restriction of the reactant fluid flow.

8. The apparatus of claim 7 wherein said area of restriction of the fluid flow is cummulatively equal to about 30 to 60 percent of said cross section width of said vessel.

9. The apparatus of claim 5 wherein the distance defined by the greater length of said bottom member and said support beam defines a distribution space for accumulation, then dispersion of said heat exchange fluid.

10. The apparatus of claim 5 wherein said flow guide members comprise at least four sloping side members with two bottoms communicating with each pair of said sloping side members, wherein the pairs of said sloping side members are situated surmounted with respect to one another and wherein the top pair of said sloping side members extends beyond the surmounted side members to form a plurality of said heat exchange fluid outlets for passage of heat exchange fluid therethrough, said heat exchange fluid outlets communicating with a heat exchange fluid supply means and wherein said pair of sloping side members are situated at a distance beyond the length of said support beam to form an additional heat exchange fluid outlet means for passage of said heat exchange fluid, wherein said heat exchange fluid outlet means communicates with a heat exchange supply means.

11. A process for the conversion of a fluid in the presence of a catalyst, at reaction conditions, which comprises contacting said fluid and said catalyst in a vessel comprising:

(a) an elongated vessel having a top, a bottom and interior and exterior side walls, said vessel having means for inlet of said reactant fluid and catalytic particles in said top, a bed of catalytic particles supported on a support means and outlet means in said bottom for removal from said vessel of catalyst particles and reactant fluid;

(b) at least one row of guide elements situated intermediate said means for inlet and said catalytic particles support means and being supported on a means communicating with said interior side walls of said vessel to form a restriction of flow of said fluid and catalytic particles through said vessel and defining, in direction of descending flow of said reactant fluid and said catalytic particles a narrowing part, then a narrow part and then a widening part, said guide elements having a triangular fluid feed cap with two sloping side walls interconnecting a bottom member and having a cooling fluid conduit communicating within said triangular feed cap, wherein said bottom member of said feed cap is of sufficient length to extend beyond the terminal portion of said guide element support means and includes a multiple number of guide element cooling fluid outlet means to pass cooling fluid through said fluid outlet means to enter said down flow of said reactant fluid and catalytic particles;

which process comprises passing said reactant fluid and said catalyst in a descending flow path through said inlet means and passing said catalyst and said fluid throughout the length of said elongated vessel and removing reacted reactant and said catalyst through said catalyst particles and reactant fluid outlet means and passing a cooling fluid through said cooling fluid outlet means to contact said cooling fluid and said reactant fluid at the narrow part of said passage through said guide elements.

12. The process of claim 11 wherein said reaction conditions include a temperature of from 300° C. to about 500° C. and a pressure of from 3 MPa to 25 MPa.

* * * * *